May 6, 1924.
F. WOODS
HAND OPERATED WINCH
Filed April 25, 1923   2 Sheets-Sheet 1
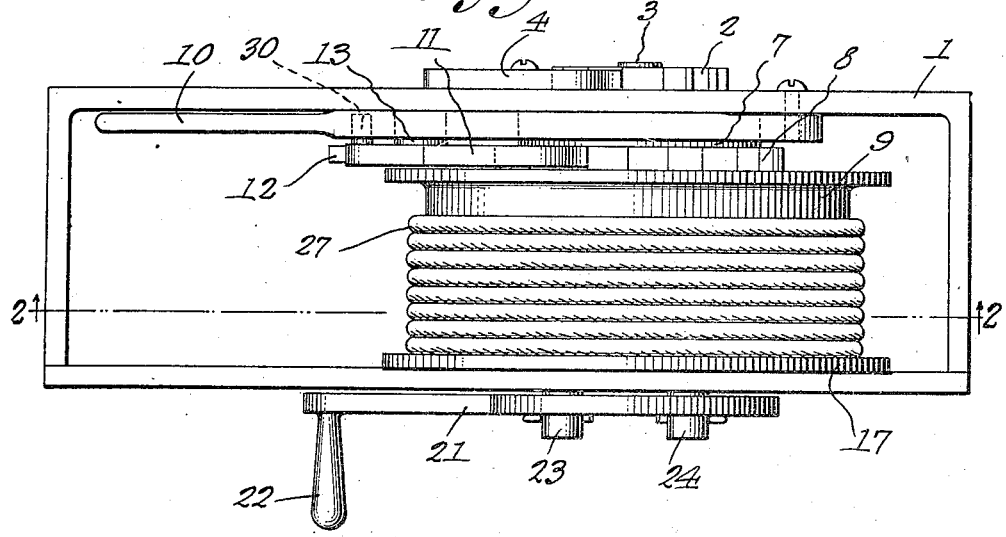
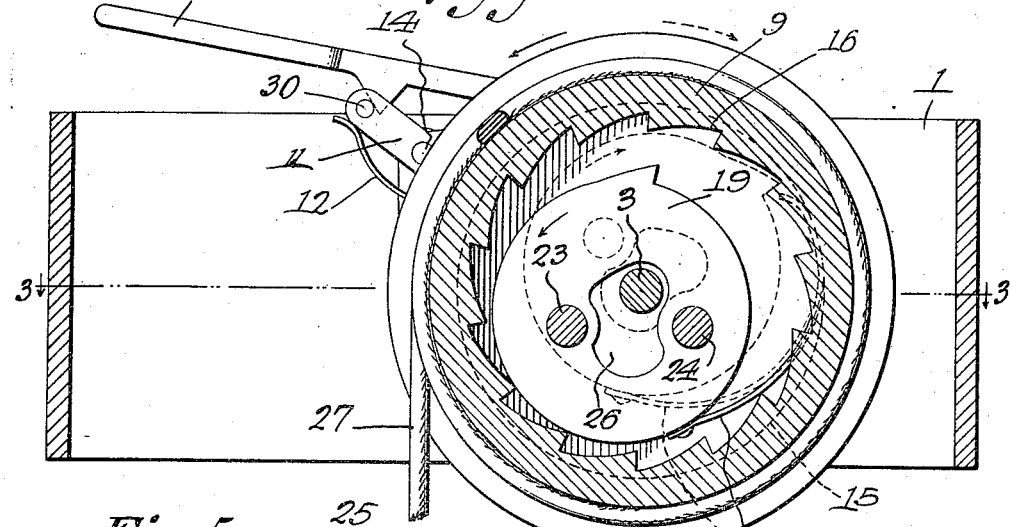
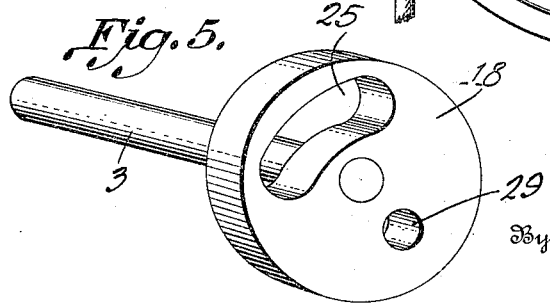
Inventor
Frank Woods
By Lesley L. Sargent
Attorney May 6, 1924.

F. WOODS

HAND OPERATED WINCH

Filed April 25, 1923   2 Sheets—Sheet 2

1,493,011

Inventor
Frank Woods

By Lester L. Sargent

Attorney

Patented May 6, 1924.

1,493,011

UNITED STATES PATENT OFFICE.

FRANK WOODS, OF STAFFORDSVILLE, KENTUCKY.

HAND-OPERATED WINCH.

Application filed April 25, 1923. Serial No. 634,552.

*To all whom it may concern:*

Be it known that I, FRANK WOODS, a citizen of the United States, residing at Staffordsville, in the county of Johnson and State of Kentucky, have invented a new and useful Hand-Operated Winch, of which the following is a specification.

The object of my invention is to provide a hand self-reversible motor for use in drawing water from wells, lifting hods on buildings, stretching wire or for other similar purposes, so constructed as to prevent the crank handle flying back and striking or injuring the operator if the device is suddenly released or reversed; and to provide the novel combination and arrangement of parts disclosed in the accompanying drawings, in which—

Figure 1 is a top plan view of my invention;

Fig. 2 is a longitudinal vertical section on line 2—2 of Fig. 1;

Fig. 5 is a detail perspective view of members 18 and 3.

Like numerals indicate like parts in each of the several views.

Figure 3:
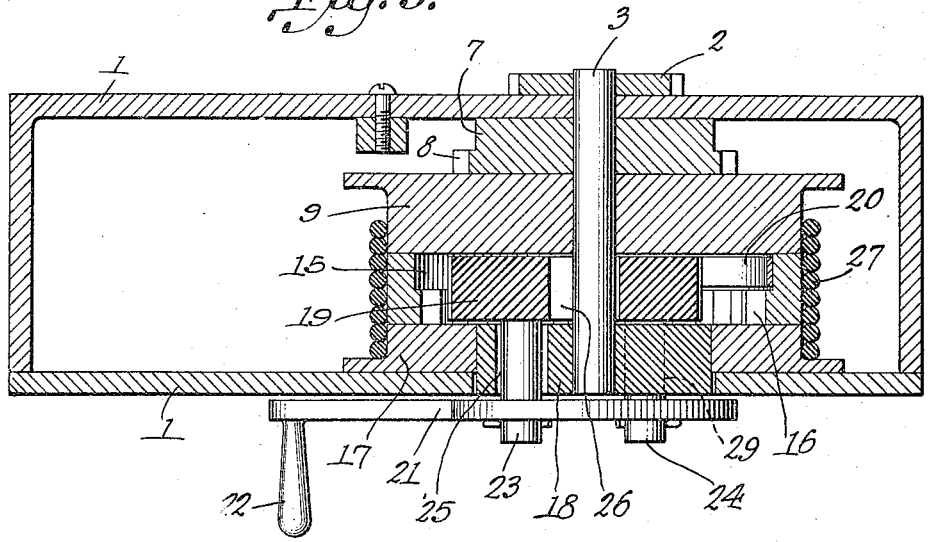
Fig. 3 is a longitudinal horizontal section on line 3—3 of Fig. 2.
Figure 4:
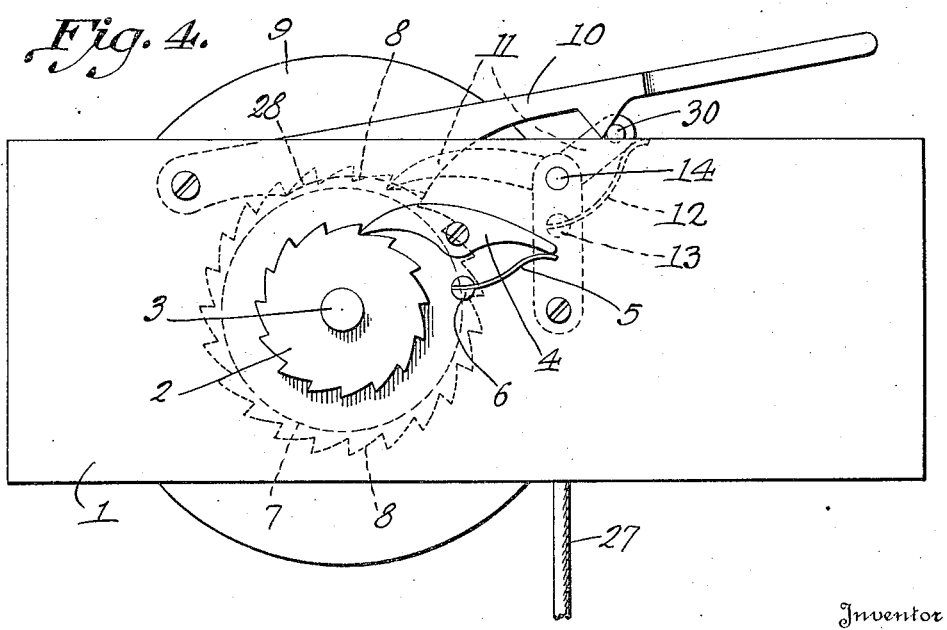
Fig. 4 is a side elevation of my invention on the hand lever side.

Referring to the accompanying drawings, I provide a suitable frame 1 in which is loosely mounted shaft 3 and disk 18, the latter being rigidly affixed to the shaft 3, as shown in Fig. 3. The shaft 3 projects through the frame 1 and carries the ratchet wheel 2 which is rigidly affixed to it and which is kept from reverse motion by the engagement of the dog 4, pressed by spring 5, which is mounted in stud 6. Also mounted on shaft 3, but inside the frame, I provide the smooth wheel 7 and ratchet wheel 8, which are affixed to each other or made integral. Ratchet wheel 8 is normally engaged by dog 11, mounted on pivot 14 and engaged by spring 12 mounted on stud 13, as shown in Fig. 4. Dog 11 carries a projection 30 which is engaged by the swingably mounted hand brake lever 10, which is provided with a suitable braking portion 28 shaped to seat on the smooth wheel 7.

Adjacent to ratchet wheel 8, I provide a cable drum 9 loosely mounted on shaft 3 and having a detachable drum section 17. Drum 9 is hollow and is provided with an enlarged cylindrical chamber 15 and an internal ratchet wheel 16. Mounted in the internal ratchet wheel 16 and the adjacent chamber 15 is an approximately disk shaped dog 19, which is normally held out of engagement with the ratchet wheel 16 by means of a suitable spring 20 mounted on the dog and bearing against the smooth surface of chamber 15, as shown in Figs. 2 and 3. Dog 18 is provided with a central cam slot 26 which affords a freedom of movement relative to the central shaft 3 which extends through the aforesaid slot. I provide pins 23 and 24 mounted in the crank handle 21 which extend through the small opening 29 and through the cam slot 25 in disk 18, respectively, and engaged in the dog 19 as shown in Figs. 2 and 3. Crank 21 is provided with a suitable handle 22. I provide the usual cable 27 suitably fastened to drum 9.

In operating the device, the turning of the crank 21 in the direction of the hands of a clock causes dog 19 to engage internal wheel 16 and rotate the drum, this internal wheel being either fixed to or integral with the drum to wind the cable. When the crank handle is released the crank remains practically stationary as the spring 20 thereupon disengages the dog 19 from internal ratchet wheel 16 and the bolt 23 moves back in slot 25 the necessary distance, thus permitting the drum which is loosely mounted on shaft 3, to unwind provided dog 11 is disengaged from ratchet wheel 8. Ratchet wheel 8 is affixed to the drum 9 and normally will prevent reverse movement of that drum by reason of the engagement of dog 11 therewith. The dog 11 is controlled by the brake lever 10 which bears against projection 30 of the dog and when pressed down disengages the dog from the gear. When pressed down still further the braking portion 28 of the lever 10 will bear against the periphery of smooth wheel 7 and exert the desired braking action on the drum. The operation above described prevents danger of injury to the operator as the crank handle 22 will never fly back and strike him but merely remain stationary when the operation of the drum is reversed.

What I claim is:

In a hand-operated winch, the combination of a frame, a rigidly connected disk and shaft rotatably mounted in said frame, means for preventing reverse rotation of the shaft, a cable drum loosely mounted on the shaft, said drum having an internal chamber and having an internal ratchet wheel, a dog mounted in said chamber releasably engageable with the ratchet wheel, resilient means normally holding the dog in disengaged position, the dog having a central slot through which the central shaft extends to permit movement of the dog to and from operative engagement with the internal ratchet wheel, a crank, spaced pins operatively connecting the crank and the dog, one of said pins extending through the slotted portion of the disk aforesaid to permit of the necessary movement of one of the pins that connect the dog with the crank in releasing the dog from operative to inoperative position, hand controlled means affixed to the cable drum for preventing a reverse operation except when such operation is desired, said means including a hand controlled brake.

FRANK WOODS.